United States Patent
Li et al.

(10) Patent No.: US 12,554,991 B2
(45) Date of Patent: Feb. 17, 2026

(54) DEVICE AND METHOD FOR PERFORMING SELF-LEARNING OPERATIONS OF AN ARTIFICIAL NEURAL NETWORK

(71) Applicant: Cambricon Technologies Corporation Limited, Beijing (CN)

(72) Inventors: Zhen Li, Beijing (CN); Qi Guo, Beijing (CN); Yunji Chen, Beijing (CN); Tianshi Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 1851 days.

(21) Appl. No.: 16/174,108

(22) Filed: Oct. 29, 2018

(65) Prior Publication Data
US 2019/0065953 A1    Feb. 28, 2019

Related U.S. Application Data

(63) Continuation-in-part of application No. PCT/CN2016/080320, filed on Apr. 27, 2016.

(51) Int. Cl.
*G06N 3/08*    (2023.01)
*G06F 17/16*    (2006.01)
(Continued)

(52) U.S. Cl.
CPC .............. *G06N 3/08* (2013.01); *G06F 17/16* (2013.01); *G06N 3/04* (2013.01); *G06N 3/047* (2023.01)

(58) Field of Classification Search
CPC ............ G06N 3/08; G06N 3/04; G06N 3/047; G06N 3/048; G06N 3/084; G06N 3/063; G06F 17/16
See application file for complete search history.

(56) References Cited

U.S. PATENT DOCUMENTS

| | | | | |
|---|---|---|---|---|
| 5,909,681 A | * | 6/1999 | Passera | G06F 18/23 |
| 6,058,206 A | * | 5/2000 | Kortge | G06F 18/21 |
| | | | | 706/30 |
| 10,521,715 B1 | * | 12/2019 | Loffe | G06N 3/044 |

FOREIGN PATENT DOCUMENTS

| | | |
|---|---|---|
| CN | 104757992 A | 7/2015 |
| CN | 105488565 A | 4/2016 |
| WO | WO 2017/185248 A1 | 11/2017 |

OTHER PUBLICATIONS

Hämäläinen, Timo, Jukka Saarinen, and Kimmo Kaski. "TUTNC: A general purpose parallel computer for neural network computations." Microprocessors and Microsystems 19.8: 447-465. (Year: 1995).*

(Continued)

*Primary Examiner* — John T Repsher, III
(74) *Attorney, Agent, or Firm* — Getech Law LLC; Jun Ye

(57) ABSTRACT

Aspects for self-learning operations of an artificial neural network are described herein. The aspects may include a master computation module configured to transmit an input vector via an interconnection unit and one or more slave computation modules connected to the master computation module via the interconnection unit. Each of the one or more slave computation modules may be configured to respectively store a column weight vector of a weight matrix and multiply the input vector with the column weight vector to generate a first multiplication result. The interconnection unit may be configured to combine the one or more first multiplication results into a first multiplication vector and transmit the first multiplication vector to the master computation module.

6 Claims, 5 Drawing Sheets

(51) Int. Cl.
G06N 3/04 (2023.01)
G06N 3/047 (2023.01)

(56) References Cited

OTHER PUBLICATIONS

EP 16899762.5—European Search Report, mailed Nov. 28, 2019, 4 pages.
EP 16899762.5—Filing Receipt, mailed Oct. 12, 2018, 49 pages.
EP 16899762.5—Communication from Examining Division, mailed Jun. 22, 2020, 7 pages.
EP 16899762.5—Response to Communication pursuant to Article 94(3) EPC, mailed Apr. 27, 2020, 62 pages.
EP 16899762.5—Summons to Attend Oral Proceedings Pursuant to Rule 115(1) EPC, mailed Jun. 22, 2020, 2 pages.
NPL Copyright Statement, 1 page.
Timo Hamalainen, et al., "TUTNC: a general purpose parallel computer for neural network computations", 1995 Elsevier Science B.V., 19 pages.
Harri Klapuri, et al., "Mapping Artificial Neural Networks to a Tree Shape Neurocomputer", Microprocessors and Microsystems, Jan. 5, 1996, 10 pages.
CN 201610267211.0—First Office Action, mailed Sep. 2, 2020, 13 pages.
PCT/CN2016/080320—International Search Report, mailed Feb. 3, 2017, 14 pages. (no English translation).
EP16899762.5, Office Action mailed Dec. 12, 2020, 6 pages.
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.

\* cited by examiner

DEVICE AND METHOD FOR PERFORMING SELF-LEARNING OPERATIONS OF AN ARTIFICIAL NEURAL NETWORK

CROSS-REFERENCE TO RELATED APPLICATIONS

The present invention is a continuation-in-part of PCT Application No. PCT/CN2016/080320, filed on Apr. 27, 2016, the entirety of which is incorporated herein by reference. The entirety of commonly owned CN Application No. 201610267211.0, filed on Apr. 27, 2016, is also incorporated herein by reference.

BACKGROUND

Convolutional deep learning processes in artificial neural networks mostly may be supervised learning algorithms. Supervised learning algorithms may require a large number of labeled samples for training purpose, which may lead to high cost of collecting such labeled samples. As such, self-taught learning algorithms may be implemented for pre-training purpose.

One known type of devices for self-taught learning algorithms is to implement a general-purpose processor. However, one of the defects of the method is lower operational performance of a single general-purpose processor which cannot meet performance requirements for multilayer neural network operations. When multiple general-purpose processors execute concurrently, the intercommunication among them also becomes a performance bottleneck.

Another known type of devices for self-taught learning algorithms may involve a graphics processing unit (GPU), which includes a general-purpose register file and a general-purpose stream processing unit to execute general purpose single-instruction-multiple-data (SIMD) instructions to support the algorithms. However, since GPU only contains rather small on-chip caching, then model data (weight values) of a multilayer artificial neural network may be repeatedly moved from the off-chip, and off-chip bandwidth becomes a main performance bottleneck, causing huge power consumption.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for self-taught learning in a neural network. The example apparatus may include a master computation module configured to transmit an input vector via an interconnection unit; and one or more slave computation modules connected to the master computation module via the interconnection unit. Each of the one or more slave computation modules may be configured to respectively store a column weight vector of a weight matrix and multiply the input vector with the column weight vector to generate a first multiplication result. The interconnection unit may be configured to combine the one or more first multiplication results into a first multiplication vector and transmit the first multiplication vector to the master computation module.

Another example aspect of the present disclosure provides an example method for self-taught learning in a neural network. The example method may include transmitting, by a master computation module, an input vector via an interconnection unit; respectively storing, by each of one or more slave computation modules connected to the master computation module via an interconnection unit, a column weight vector of a weight matrix; multiplying, by each of the one or more slave computation modules, the input vector with the column weight vector to generate a first multiplication result; combining, by the interconnection unit, the one or more first multiplication results into a first multiplication vector; and transmitting, by the interconnection unit, the first multiplication vector to the master computation module.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Figure 1:
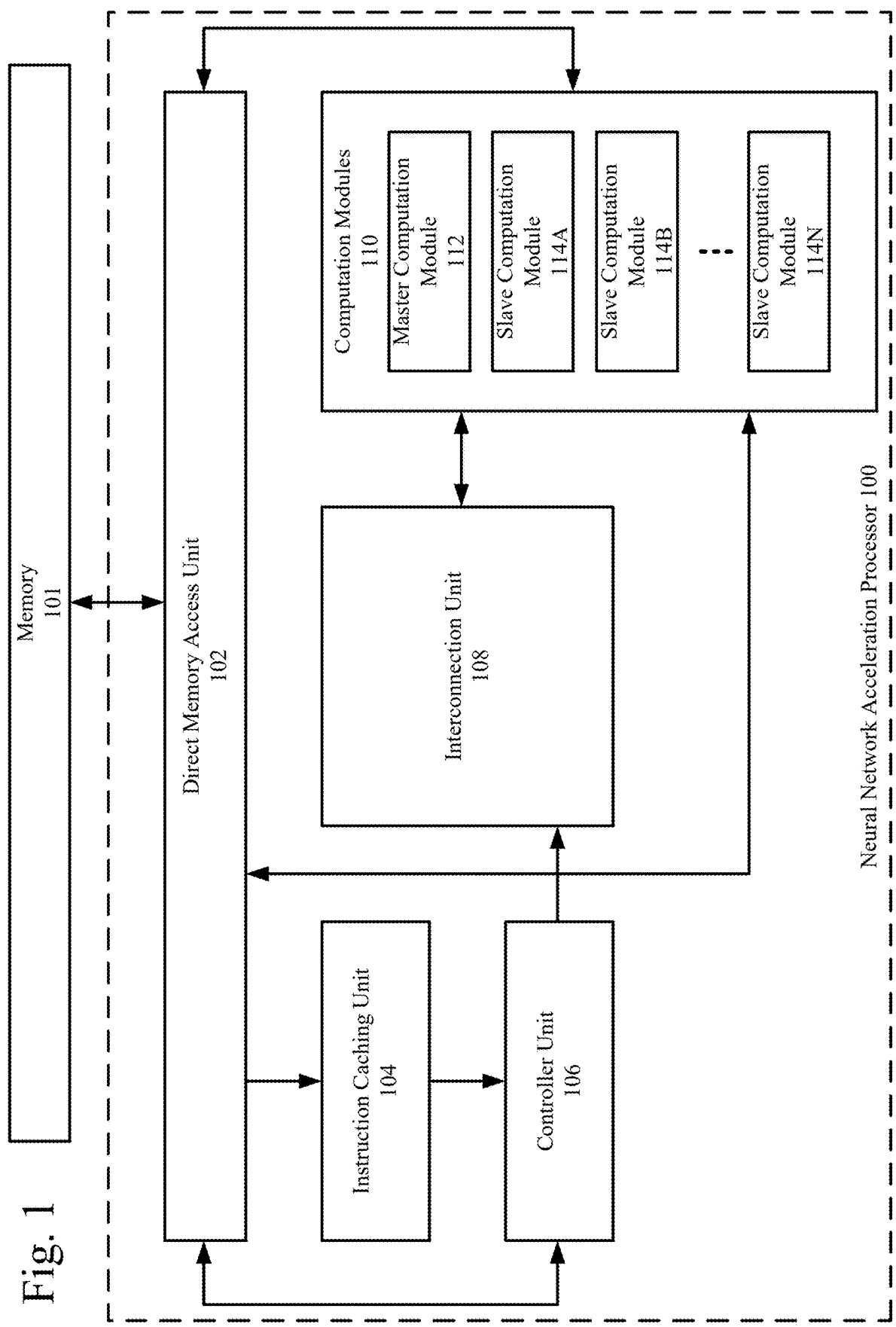
FIG. 1 is a block diagram illustrating an example neural network acceleration processor by which self-taught learning algorithms may be implemented.

FIG. 1 is a block diagram illustrating an example neural network acceleration processor 100 by which self-taught learning algorithms may be implemented.

As depicted, the example neural network acceleration processor 100 may include an instruction caching unit 104, a controller unit 106, a direct memory access unit 102, an interconnection unit 108, a plurality of computation modules 110 that may include the master computation module 112 and one or more slave computation modules 114 (e.g., 114A, 114B ... 114N). Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, the instruction caching unit 104 may be configured to receive or read instructions from the direct memory access unit 102 and cache the received instructions. The controller unit 106 may be configured to read instructions from the instruction caching unit 104 and decode one of the instructions into micro-instructions for controlling operations of other modules including the direct memory access unit 102, the master computation module 112, the slave computation modules 114, etc. In other words, the modules including the direct memory access unit 102, the master computation module 112, and the slave computation modules 114 may be configured to respectively perform the micro-instructions.

The direct memory access unit 102 may be configured to access an external address range (e.g., in an external storage device such as a memory 101) and directly read or write data into respective caching units in the computation modules 110.

In some example, an IO instruction may be pre-stored into a head address of the instruction caching unit 104. The IO instruction may instruct the direct memory access unit 102 to read an input vector from an external address space, e.g., the memory 101. The IO instruction may further instruct the direct memory access unit 102 to store output data back into the external space after completion of computation. A vector may refer to one or more values arranged in a one-dimensional data structure. The one or more values may be referred to as the elements of the vector. For example, the input vector may be represented as $(in_1, in_2, in_3, \ldots in_m)$.

The controller unit 106 may be configured to read the IO instruction from the head address of the instruction caching unit 104. According to the decoded micro-instruction, the direct memory access unit 102 may be configured to read data relevant to the self-taught learning process (e.g., the input vector, one or more bias vectors, a weight matrix, etc.) and to store the above data in one or more caching units in the master computation module 112.

In some examples, the direct memory access unit 102 may be configured to retrieve the input vector, the weight matrix, and the bias vectors from the memory 101. The weight matrix may include one or more weight values arranged in a two-dimensional data structure. The weight values that are horizontally grouped together may be referred to as row weight vectors; the weight values that are vertically grouped together may be referred to as column weight vectors. An m×n weight matrix may refer to a weight matrix that includes row vectors of a number m and column vector of a number n. For example, the m×n weight matrix may be represented as $$\begin{bmatrix} w_{11} & w_{12} & w_{13} & \ldots & w_{1n} \\ w_{21} & w_{22} & w_{23} & \ldots & w_{2n} \\ w_{31} & w_{32} & w_{33} & \ldots & w_{3n} \\ \vdots & \vdots & \vdots & \ddots & \vdots \\ w_{m1} & w_{m2} & w_{m3} & \ldots & w_{mm} \end{bmatrix}.$$

The weight matrix also may be referred to as $\vec{W}$. The input vector and the bias vectors may be transmitted by the direct memory access unit 102 to the master computation module 112. Each column weight vector of the weight matrix, e.g., $$\begin{pmatrix} w_{11} \\ w_{21} \\ w_{31} \\ \vdots \\ w_{m1} \end{pmatrix},$$

may be respectively transmitted to the slave computation modules 114 and stored in one or more caching units in respective slave computation modules 114.

In some examples, a pre-training process of the self-taught learning process in a neural network may include four phases.

The First Phase

In the first phase, the master computation module 110 may be configured to transmit the input vector (may be referred to as "$\vec{v_0}$") to the slave computation modules 114. Upon receiving the input vector, each of the slave computation modules 114 may be configured to multiply the input vector with the column weight vector stored in the respective slave computation module. For example, the slave computation module 114A may be configured to multiply the input vector with the first column weight vector stored therein, e.g., $(in_1, in_2, in_3, \ldots in_m)$.

$$\begin{pmatrix} w_{11} \\ w_{21} \\ w_{31} \\ \vdots \\ w_{m1} \end{pmatrix}.$$

The multiplication result may be a scalar value represented as $in_1w_{11}+in_2w_{21}+ \ldots +in_mw_{m1}$. Since each slave computation module 114 may be configured to calculate a multiplication result. The one or more multiplication results generated by the one or more slave computation modules 114 may be transmitted to the interconnection unit 108. The interconnection unit 108 may be configured to combine the multiplication results into a first multiplication vector (hereinafter "$\vec{m}_1$"). The first multiplication vector may be structured as a 1×n row vector.

The first multiplication vector may be transmitted by the interconnection unit 108 to the master computation module 112. The master computation module 112 may optionally perform one or more operations to the first multiplication vector. For example, the master computation module 112 may add a first bias vector to the first multiplication vector to generate a first biased vector, e.g., $\vec{m}_1 + \vec{b}_1$, in which $\vec{b}_1$ represents the second bias vector. Alternatively or additionally, the master computation module 112 may be configured to activate the first biased vector, e.g., $f(\vec{m}_1 + \vec{b}_1)$, in which $f(\ )$ represents an activation function, to generate a first activated vector. The activation function may be one of a sigmoid function, a tanh function, a relu function, or a softmax function. Further, the master computation module 112 may be configured to sample the first activated vector by a Gibbs sampler, that is, according to the Gibbs sampling, to generate a first phase hidden layer vector (hereinafter "$\vec{h}_0$").

The Second Phase

In the second phase, the master computation module 112 may be configured to transmit the first phase hidden layer vector $\vec{h}_0$ to the slave computation modules 114 via the interconnection unit 108. Each of the slave computation modules 114 may be configured to multiply an element of the first phase hidden layer vector $\vec{h}_0$ with the column weight vector. Since the first phase hidden layer vector $\vec{h}_0$ may be a column vector, the multiplication result between the element of the first phase hidden layer vector $\vec{h}_0$ and the column weight vector may be a column vector. Similarly, the one or more multiplication result vectors generated by the one or more slave computation modules 114 may be transmitted to the interconnection unit 108. The interconnection unit 108 may be configured to add the multiplication result vectors into a second multiplication vector (hereinafter "$\vec{m}_2$"). The second multiplication vector may be structured as a m×1 column vector.

The second multiplication vector may be transmitted by the interconnection unit 108 to the master computation module 112. The master computation module 112 may optionally perform one or more operations to the second multiplication vector. For example, the master computation module 112 may add a second bias vector to the second multiplication vector to generate a second biased vector, e.g., $\vec{m}_2 + \vec{b}_2$, in which $\vec{b}_2$ represents the second bias vector. Alternatively or additionally, the master computation module 112 may be configured to activate the second biased vector, e.g., $f(\vec{m}_2 + \vec{b}_2)$, in which $f(\ )$ represents an activation function, to generate a second activated vector. The activation function may be one of a sigmoid function, a tanh function, a relu function, or a softmax function. Further alternatively or additionally, the master computation module 112 may be configured to sample the second activated vector by a Gibbs sampler, that is, according to the Gibbs sampling, to generate a second phase visible layer vector (hereinafter "$\vec{v}_1$").

The Third Phase

In the third phase, the master computation module 112 may be configured to transmit the second phase visible layer vector $\vec{v}_1$ to the slave computation modules 114 via the interconnection unit 108. Each of the slave computation modules 114 may be configured to multiply the second phase visible layer vector $\vec{v}_1$ with the stored column weight vector. Similarly, the one or more multiplication results generated by the one or more slave computation modules 114 may be transmitted to the interconnection unit 108. The interconnection unit 108 may be configured to combine the multiplication results into a third multiplication vector (hereinafter "$\vec{m}_3$"). The third multiplication vector may be structured as a 1×n row vector.

The third multiplication vector may be transmitted by the interconnection unit 108 to the master computation module 112. The master computation module 112 may optionally perform one or more operations to the third multiplication vector. For example, the master computation module 112 may add a third bias vector to the third multiplication vector to generate a third biased vector, e.g., $\vec{m}_3 + \vec{b}_3$, in which $\vec{b}_3$ represents the third bias vector. Alternatively or additionally, the master computation module 112 may be configured to activate the third biased vector, e.g., $f(\vec{m}_3 + \vec{b}_3)$, in which $f(\ )$ represents an activation function, to generate a third phase hidden layer vector (hereinafter "$\vec{h}_1$"). The activation function may be one of a sigmoid function, a tanh function, a relu function, or a softmax function.

The Fourth Phase

In the fourth phase, the master computation module 112 may be configured to transmit the input vector $\vec{v}_0$, the first phase hidden layer vector $\vec{h}_0$, the second phase visible layer vector $\vec{v}_1$, and the third phase hidden layer vector $\vec{h}_1$ to the one or more slave computation modules 114 via the interconnection unit 108. The slave computation modules 114 may be configured to calculate a first cross product between a transpose of the input vector $\vec{v}_0^T$ and the first phase hidden layer vector $\vec{h}_0$. The calculation of the first cross product may be represented as $\vec{h}_0 \times \vec{v}_0^T$. Further, the slave computation modules 114 may be configured to calculate a second cross product between a transpose of the second phase visible layer vector $\vec{v}_1^T$ and the third phase hidden layer vector $\vec{h}_1$. The calculation of the second cross product may be represented as $\vec{h}_1 \times \vec{v}_1^T$.

Further still, the slave computation modules 114 may be configured to calculate weight gradients based on a learning rate and a difference between the first cross product and the second cross product. The learning rate may refer to a parameter predetermined and adjustable by a system administrator. The calculation of the weight gradients may be represented as $\epsilon(\vec{h}_0 \times \vec{v}_0^T - \vec{h}_1 \times \vec{v}_1^T)$, in which $\epsilon$ represents the learning rate. The slave computation modules 114 may be further configured to update the weight matrix based on the weight gradients. The update of the weight matrix may be represented as $\vec{W}_{new} = \vec{W} - \epsilon(\vec{h}_0 \times \vec{v}_0^T - \vec{h}_1 \times \vec{v}_1^T)$, in which $\vec{W}_{new}$ represents the updated weight matrix.

Further, the master computation module 112 may be configured to update the first bias vector $\vec{b}_1$, the second bias vector $\vec{b}_2$, and the third bias vector $\vec{b}_3$. In some examples, the first bias vector and the third bias vector may refer to a same vector. Thus, with respect to the first bias vector and the third bias vector, the master computation module 112 may be configured to calculate a difference between the first phase hidden layer vector $\vec{h}_0$ and the third phase hidden layer vector $\vec{h}_1$ to update the first bias vector and the third bias vector. For example, the update process may be represented as $\vec{b}_{1/3} - \epsilon(\vec{h}_0 - \vec{h}_1)$, in which $\vec{b}_{1/3}$ represents the first bias vector or the third bias vector.

With respect to the second bias vector, the master computation module 112 may be configured to calculate a difference between the input vector $\vec{v}_0$ and the second phase visible layer vector $\vec{v}_1$ to update the second bias vector. For example, the update process may be represented as $\vec{b}_2 - \epsilon(\vec{v}_0 - \vec{v}_1)$.

The four phases of the pre-training process of the self-taught learning process may be repeated for one or more times until the weight gradients are less than a predetermined threshold.

Figure 2:
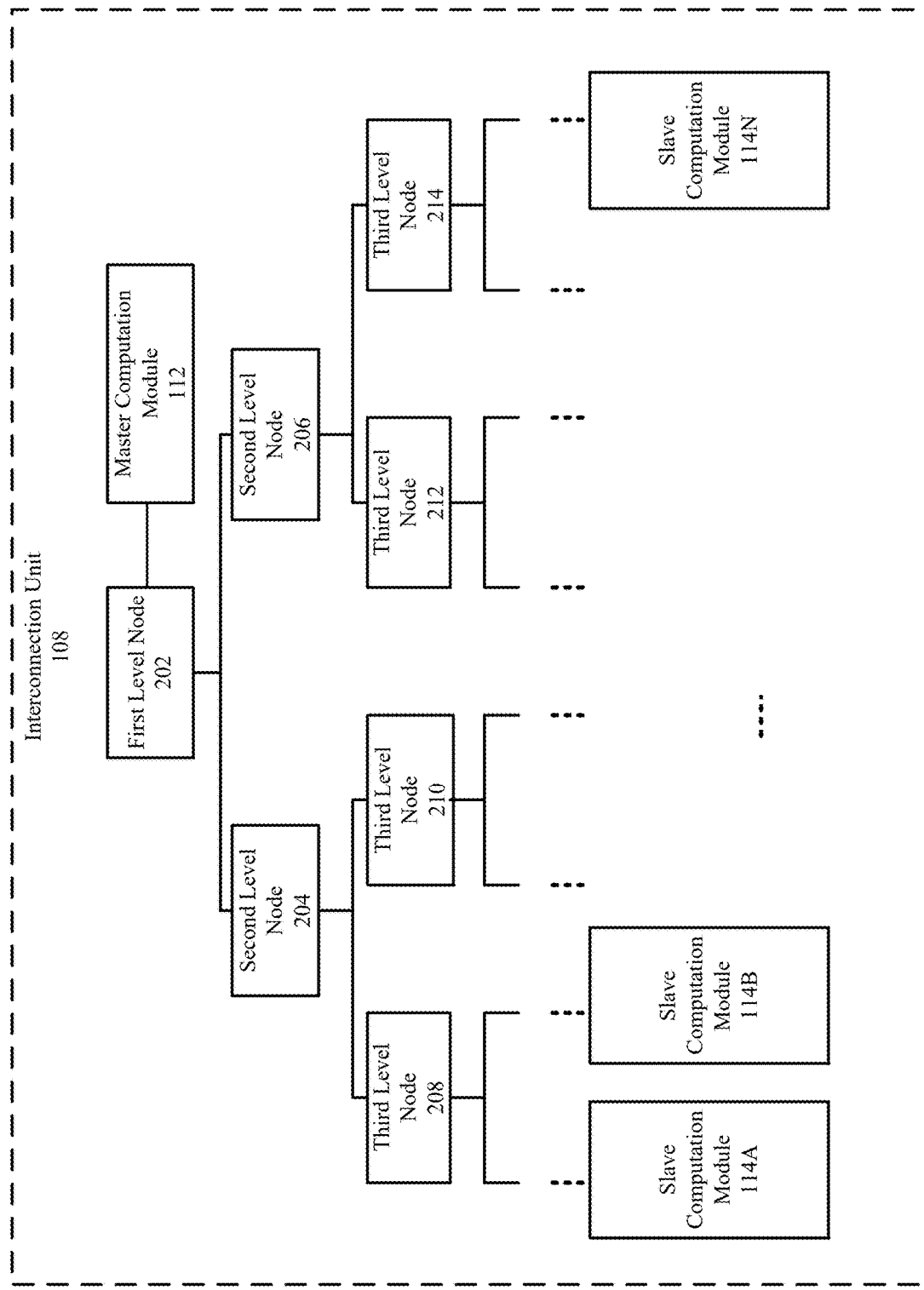
FIG. 2 is a block diagram illustrating an example interconnection unit by which self-taught learning algorithms may be implemented.

FIG. 2 is a block diagram illustrating an example interconnection unit by which self-taught learning algorithms may be implemented.

As depicted, the interconnection unit 108 may be structured as a binary tree that includes multiple levels (e.g., from top level to lower levels). Each level may include one or more nodes. Each node may be configured to send data to two nodes at a lower level. Further, each node may combine or add data received from two nodes at a lower level. The combined data may be transmitted to a node at a higher level. For example, the received data (e.g., a and b) from the two nodes at the lower level may be combined into a 2-dimensional vector (e.g., (a, b)) by the node at this level. The combined data, i.e., the 2-dimensional vector may be transmitted to a node at a higher level and further combined into a 4-dimensional vector. Alternatively, or additionally, each node may be configured to add data received from the two nodes at the lower level and the sum of the addition may be sent to the node at the high level.

Figure 4:
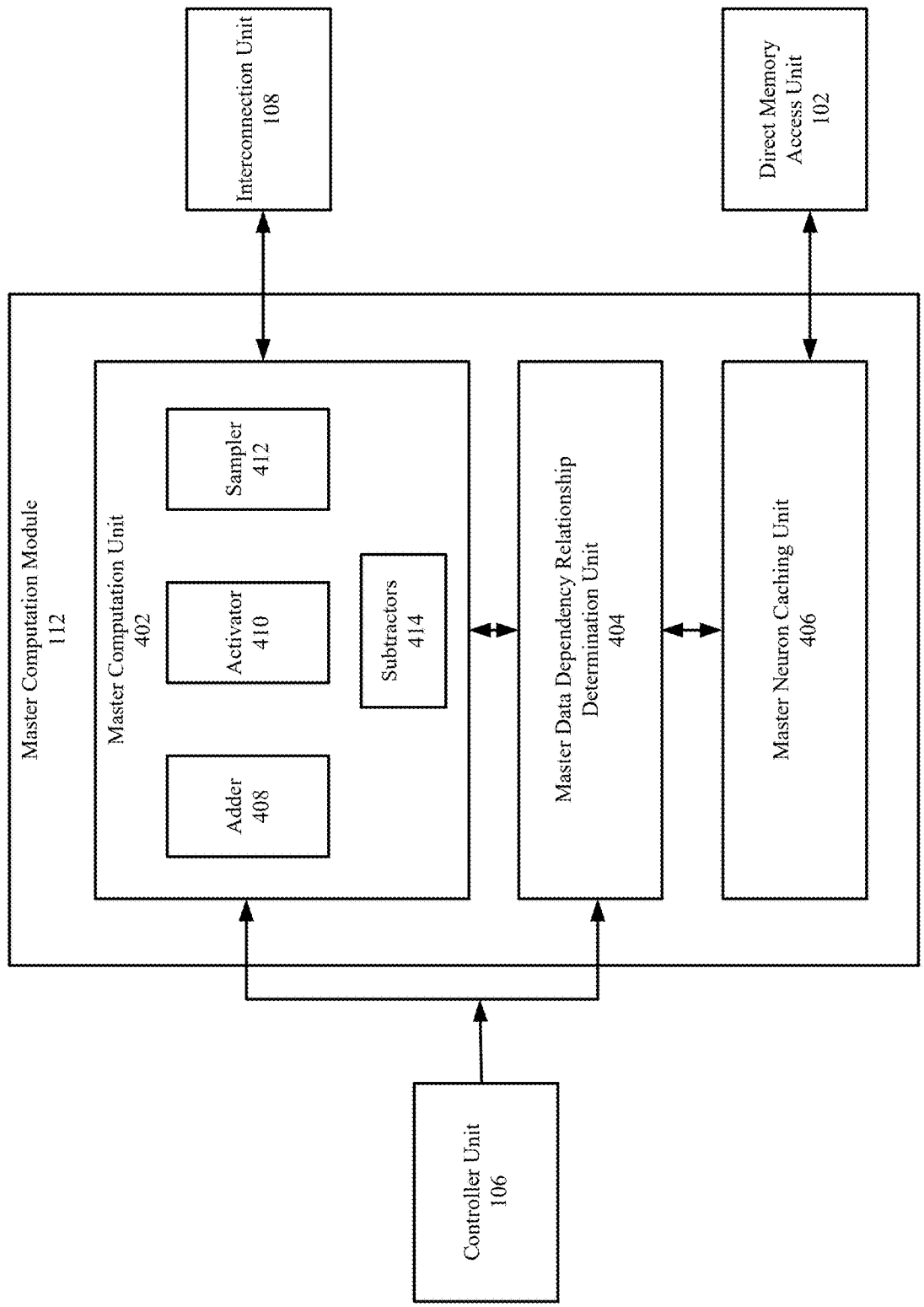
FIG. 4 is a block diagram illustrating an example master computation module by which self-taught learning algorithms may be implemented.

As shown in FIG. 4, the nodes of the binary tree at the lowest levels may be connected to the slave computation module 114. The data output from the slave computation modules 114 may be combined or summed at the multiple levels to generate a value or a vector at the first level node 202. The generated value or vector may be transmitted to the master computation module 112.

Figure 3:
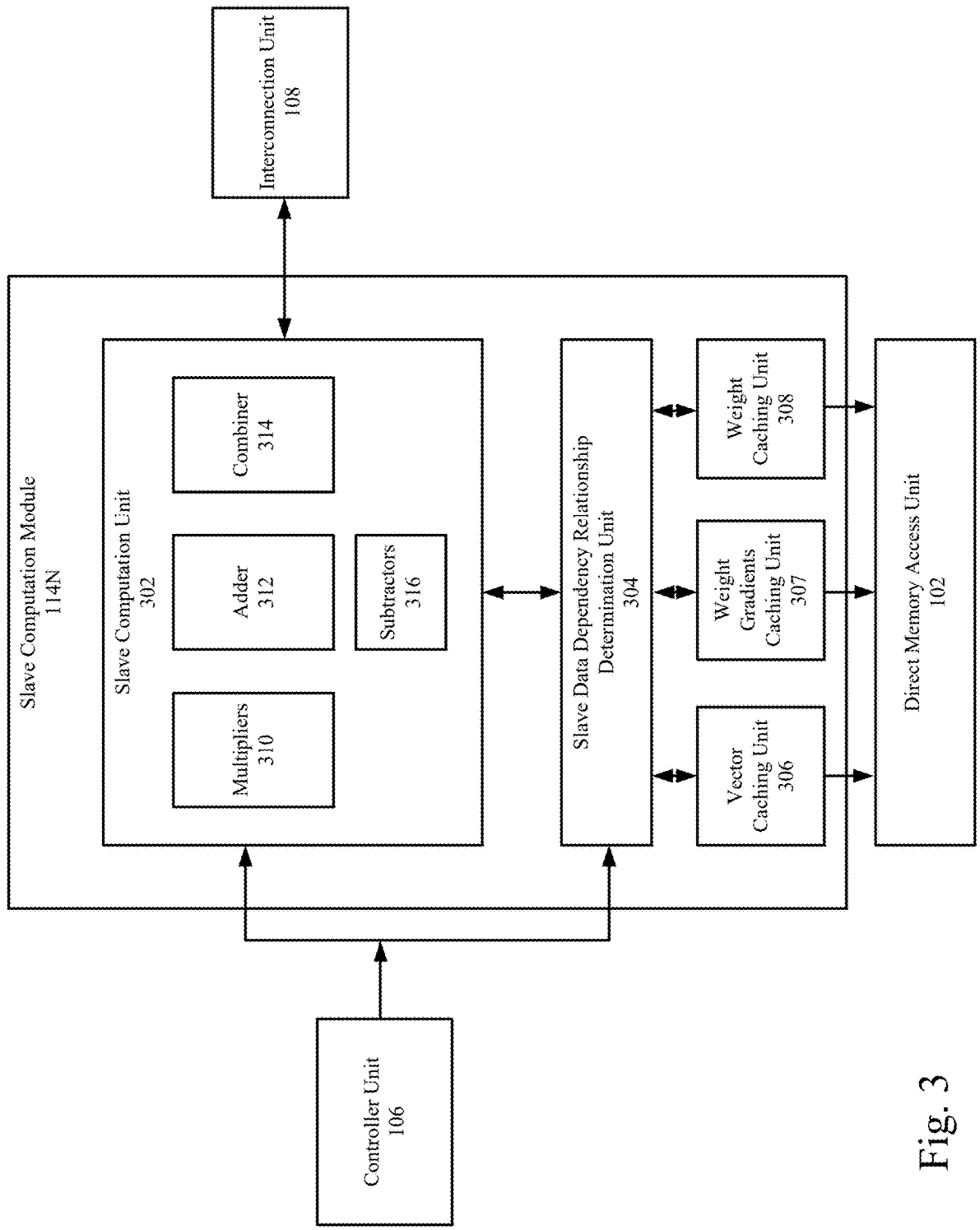
FIG. 3 is a block diagram illustrating an example slave computation module by which self-taught learning algorithms may be implemented.

FIG. 3 is a block diagram illustrating an example slave computation module by which self-taught learning algorithms may be implemented.

As shown in FIG. 3, the example slave computation module 114N may include a slave computation unit 302, a slave data dependency relationship determination unit 304, a vector caching unit 306, a weight gradients caching unit 307, and a weight caching unit 308. Hereinafter, a caching unit (e.g., a master neuron caching unit 606, the vector caching unit 306, the weight gradients caching unit 307, the weight caching unit 308, etc.) may refer to an on-chip caching unit integrated in the neural network acceleration processor 100, rather than other storage devices in memory 101 or other external devices. In some examples, the on-chip caching unit may be implemented as an on-chip buffer, an on-chip Static Random Access Memory (SRAM), or other types of on-chip storage devices that may provide higher access speed than the external memory.

The slave data dependency relationship determination unit 304 may be configured to perform data access operations (e.g., reading or writing operations) on the caching units including the vector caching unit 306, the weight gradients caching unit 307, and the weight caching unit 308 during the computation process. The slave data dependency relationship determination unit 304 may be configured to prevent conflicts in reading and writing of the data in the caching units. For example, the slave data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the slave data dependency relationship determination unit 304 may be stored in an instruction queue within the slave data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The vector caching unit 306 may be configured to store the input vector $\vec{v}_0$, the first phase hidden layer vector $\vec{h}_0$, the second phase visible layer vector $\vec{v}_1$, the third phase hidden layer vector $\vec{h}_1$, and the multiplication results. The weight gradients caching unit 307 may be configured to store the weight gradients for updating the weight matrix. The weight caching unit 308 may be configured to store the column weight vector corresponding to the slave computation module 114N.

The slave computation unit 302 may further include one or more multipliers 310, an adder 312, a combiner 314, and one or more subtractors 316.

In the first phase, upon receiving the input vector, the multipliers 310 may be configured to multiply the elements in the input vector respectively with the elements in the column weight vector. The partial multiplication results between the elements may be added by the adder 312 to generate the multiplication result of the input vector and the column weight vector. The multiplication result may be transmitted to the interconnection unit 108.

In the second phase, upon receiving the first phase hidden layer vector $\vec{h}_0$, the multipliers 310 may be configured to multiply each element of the first phase hidden layer vector $\vec{h}_0$ respectively with the column weight vector to generate one or more multiplication result vectors. The multiplication result vectors may be transmitted to the interconnection unit 108. The interconnection unit 108 may be configured to add the one or more multiplication result vectors into a second multiplication vector.

In the third phase, upon receiving the second phase visible layer vector $\vec{v}_1$, the multipliers 310 may be configured to multiply the elements in the second phase visible layer vector $\vec{v}_1$ respectively with the elements in the column weight vector. The partial multiplication results between the elements may be added by the adder 312 to generate the multiplication result of the second phase visible layer vector $\vec{v}_1$ and the column weight vector. The multiplication result may be transmitted to the interconnection unit 108.

In the fourth phase, upon receiving the input vector $\vec{v}_0$, the first phase hidden layer vector $\vec{h}_0$, the second phase visible layer vector $\vec{v}_1$, and the third phase hidden layer vector $\vec{h}_1$, the multipliers 310 may be configured to multiply the elements of the transpose of the input vector $\vec{v}_0^T$ respectively with the first phase hidden layer vector $\vec{h}_0$ to calculate the first cross product. The partial multiplication results between the elements may be combined by the combiner 314 into the first cross product.

Similarly, the multipliers 312 may be configured to multiply the elements in the transpose of the second phase visible layer vector $\vec{v}_1^T$ respectively with the elements in the third phase hidden layer vector $\vec{h}_1$. The partial multiplication results of the elements may be combined by the combiner 314 into the second cross product.

The subtractors 316 may be configured to calculate a difference between the first cross product and the second cross product to generate the weight gradients. The calculation of the weight gradients may be represented as $\epsilon(\vec{h}_0 \times \vec{v}_0^T - \vec{h}_1 \times \vec{v}_1^T)$, in which $\epsilon$ represents the learning rate. The slave computation unit 302 may be further configured to update the weight matrix based on the weight gradients. The update of the weight matrix may be represented as $\vec{W}_{new} = \vec{W} - \epsilon(\vec{h}_0 \times \vec{v}_0^T - \vec{h}_1 \times \vec{v}_1^T)$ in which $\vec{W}_{new}$ represents the updated weight matrix.

FIG. 4 is a block diagram illustrating an example master computation module by which self-taught learning algorithms may be implemented.

As shown in FIG. 4, the master computation module 312 may include a master computation unit 402, a master data dependency relationship determination unit 404, and a master neuron caching unit 406. The master computation unit 402 may further include an adder 408, an activator 410, and a sampler 412.

Similar to the slave data dependency relationship determination unit 304, the master data dependency relationship determination unit 404 may be configured to perform data access operations (e.g., reading or writing operations) on the caching units including the master neuron caching unit 406 during the computation process. The master data dependency relationship determination unit 404 may be configured to prevent conflicts in reading and writing of the data in the caching units including the master neuron caching unit 406. For example, the master data dependency relationship determination unit 404 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the master data dependency relationship determination unit 404 may be stored in an instruction queue within the master data dependency relationship determination unit 404. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The master neuron caching unit 606 may be configured to store the first bias vector, the second bias vector, the third bias vector, the first biased vector, the second biased vector, the third biased vector, and other results of the process such as the input vector $\vec{v}_0$, the first phase hidden layer vector $\vec{h}_0$, the second phase visible layer vector $\vec{v}_1$, and the third phase hidden layer vector $\vec{h}_1$.

The master computation unit 402 may further include an adder 408, an activator 410, a sampler 412, and one or more subtractors 414.

In the first phase, upon receiving the first multiplication vector from the interconnection unit 108, the master computation module 112 may optionally perform one or more operations to the first multiplication vector. For example, the adder 408 may add a first bias vector to the first multiplication vector to generate a first biased vector, e.g., $\vec{m}_1 + \vec{b}_1$, in which $\vec{b}_1$ represents the second bias vector. Alternatively or additionally, the activator 410 may be configured to activate the first biased vector, e.g., $f(\vec{m}_1 + \vec{b}_1)$, in which $f(\ )$ represents an activation function, to generate the first activated vector. For example, the activator 410 may be configured to perform interpolation or table looking-up operations to apply the activation function. The activator 410 may further include one or more adders and one or more multipliers for the activation function. Further, the sampler 412 may be configured to sample the first activated vector according to the Gibbs sampling to generate the first phase hidden layer vector $\vec{h}_0$. In some examples, the sampler 412 may include one or more random number generators (e.g., linear-feedback shift register (LFSR) modules) to generate one or more random numbers. The sampler 412 may further include one or more comparers configured to compare elements in the first activated vector with the generated random numbers. The results of the Gibbs sampling may be generated based on the comparison. For example, if a random number is greater than an element, the element may be kept as a valid value; otherwise, the element may be discarded.

In the second phase, upon receiving the second multiplication vector from the interconnection unit 108, the master computation module 112 may optionally perform one or more operations to the second multiplication vector. For example, the adder 408 may add a second bias vector to the second multiplication vector to generate a second biased vector, e.g., $\vec{m}_2 + \vec{b}_2$, in which $\vec{b}_2$ represents the second bias vector. Alternatively or additionally, the activator 410 may be configured to activate the second biased vector, e.g., $f(\vec{m}_2 + \vec{b}_2)$, in which $f(\ )$ represents an activation function, to generate a second activated vector. Further, the sampler 412 may be similarly configured to sample the second activated vector according to the Gibbs sampling to generate the second phase hidden layer vector $\vec{v}_1$.

In the third phase, upon receiving the third multiplication vector from the interconnection unit 108, the master computation module 112 may optionally perform one or more operations to the third multiplication vector. For example, the adder 408 may add a third bias vector to the third multiplication vector to generate a third biased vector, e.g., $\vec{m}_3 + \vec{b}_3$, in which $\vec{b}_3$ represents the third bias vector. Alternatively or additionally, the activator 410 may be similarly configured to activate the third biased vector, e.g., $f(\vec{m}_3 + \vec{b}_3)$, in which $f(\ )$ represents an activation function, to generate a third phase hidden layer vector $\vec{h}_1$.

In the fourth phase, the master computation module 112 may be configured to update the first bias vector $\vec{b}_1$, the second bias vector $\vec{b}_2$, and the third bias vector $\vec{b}_3$. With respect to the first bias vector and the third bias vector, the subtractors 414 may be configured to calculate a difference between the first phase hidden layer vector $\vec{h}_0$ and the third phase hidden layer vector $\vec{h}_1$ to update the first bias vector and the third bias vector. For example, the update process may be represented as $\vec{b}_{1/3} - \epsilon(\vec{h}_0 - \vec{h}_1)$, in which $\vec{b}_{1/3}$ represents the first bias vector or the third bias vector.

With respect to the second bias vector, the subtractor 414 may be configured to calculate a difference between the input vector $\vec{v}_0$ and the second phase visible layer vector $\vec{v}_1$ to update the second bias vector. For example, the update process may be represented as $\vec{b}_2 - \epsilon(\vec{v}_0 - \vec{v}_1)$.

Figure 5:
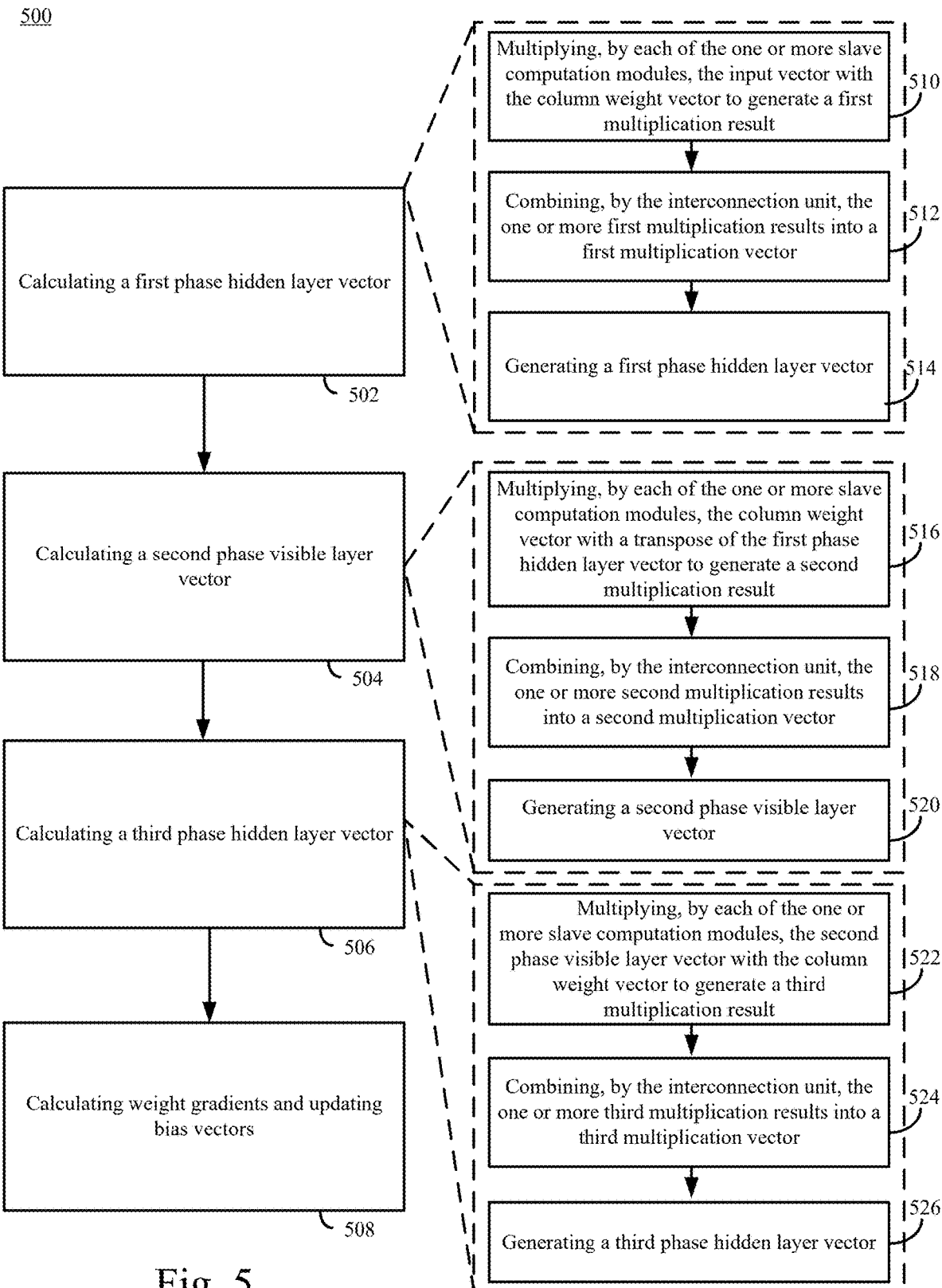
FIG. 5 is a flow chart of an example method for self-taught learning algorithms performed by components according to the present disclosure.

FIG. 5 is a flow chart of an example method 500 for self-taught learning algorithms performed by components according to the present disclosure. The example method 500 may be performed by one or more components described in accordance with FIGS. 1-4.

At block 502, the example method 500 may include calculating a first phase hidden layer vector. For example, the master computation module 110 may be configured to transmit the input vector (may be referred to as "$\vec{v}_0$") to the slave computation modules 114. Block 502 may further include sub-operations illustrated by blocks 510, 512, and 514.

At block 510, the example method 500 may include multiplying, by each of the one or more slave computation modules, the input vector with the column weight vector to generate a first multiplication result. For example, upon receiving the input vector, each of the slave computation modules 114 may be configured to multiply the input vector with the column weight vector stored in the respective slave computation module. For example, the slave computation module 114A may be configured to multiply the input vector with the first column weight vector stored therein, e.g., $(in_1, in_2, in_3, \ldots in_m)$.

$$\begin{pmatrix} w_{11} \\ w_{21} \\ w_{31} \\ \vdots \\ w_{m1} \end{pmatrix}.$$

The multiplication result may be a scalar value represented as $in_1 w_{11} + in_2 w_{21} + \ldots + in_m w_{m1}$. Since each slave computation module 114 may be configured to calculate a multiplication result. The one or more multiplication results generated by the one or more slave computation modules 114 may be transmitted to the interconnection unit 108.

At block 512, the example method 500 may include combining, by the interconnection unit, the one or more first multiplication results into a first multiplication vector. For example, the interconnection unit 108 may be configured to combine the multiplication results into a first multiplication vector (hereinafter "$\vec{m}_1$"). The first multiplication vector may be structured as a 1×n row vector. The first multiplication vector may be transmitted by the interconnection unit 108 to the master computation module 112.

At block 514, the example method 500 may include generating a first phase hidden layer vector. For example, the master computation module 112 may optionally perform one or more operations to the first multiplication vector. For example, the master computation module 112 may add the first bias vector to the first multiplication vector to generate the first biased vector, e.g., $\vec{m}_1 + \vec{b}_1$, in which $\vec{b}_1$ represents the second bias vector. Alternatively or additionally, the master computation module 112 may be configured to activate the first biased vector, e.g., $f(\vec{m}_1 + \vec{b}_1)$, in which $f(\ )$ represents an activation function, to generate the first activated vector. The activation function may be one of a sigmoid function, a tanh function, a relu function, or a softmax function. Further, the master computation module 112 may be configured to sample the first activated vector by a Gibbs sampler, that is, according to the Gibbs sampling, to generate the first phase hidden layer vector. The process may continue to block 504.

At block 504, the example method 500 may include calculating a second phase visible layer vector. In the second phase, the master computation module 112 may be configured to transmit the first phase hidden layer vector $\vec{h}_0$ to the slave computation modules 114 via the interconnection unit 108. Block 504 may further include sub-operations illustrated by blocks 516, 518, and 520.

At block 516, the example method 500 may include multiplying, by each of the one or more slave computation modules, the column weight vector with a transpose of the first phase hidden layer vector to generate a second multiplication result. For example, each of the slave computation modules 114 may be configured to multiply a transpose of the first phase hidden layer vector $\vec{h}_0$ with the column weight vector. Since the first phase hidden layer vector $\vec{h}_0$ may be a column vector, the multiplication result between the transpose of the first phase hidden layer vector $\vec{h}_0$ and the column weight vector may be a scalar value. Similarly, the one or more multiplication results generated by the one or more slave computation modules 114 may be transmitted to the interconnection unit 108.

At block 518, the example method 500 may include combining, by the interconnection unit, the one or more second multiplication results into a second multiplication vector. For example, the interconnection unit 108 may be configured to combine the multiplication results into a second multiplication vector.

At block 520, the example method 500 may include generating a second phase visible layer vector. For example, the master computation module 112 may optionally perform one or more operations to the second multiplication vector.

For example, the master computation module 112 may add a second bias vector to the second multiplication vector to generate a second biased vector, e.g., $\vec{m_2}+\vec{b_2}$, in which $\vec{b_2}$ represents the second bias vector. Alternatively or additionally, the master computation module 112 may be configured to activate the second biased vector, e.g., $f(\vec{m_2}+\vec{b_2})$, in which $f( )$ represents an activation function, to generate a second activated vector. The activation function may be one of a sigmoid function, a tanh function, a relu function, or a softmax function. Further alternatively or additionally, the master computation module 112 may be configured to sample the second activated vector by a Gibbs sampler, that is, according to the Gibbs sampling, to generate a second phase visible layer vector. Process may continue to block 506.

At block 506, the example method 500 may include calculating a third phase hidden layer vector. In the third phase, the master computation module 112 may be configured to transmit the second phase visible layer vector $\vec{v_1}$ to the slave computation modules 114 via the interconnection unit 108. Block 506 may further include sub-operations illustrated by blocks 522, 524, and 526.

At block 522, the example method 500 may include multiplying, by each of the one or more slave computation modules, the second phase visible layer vector with the column weight vector to generate a third multiplication result. For example, each of the slave computation modules 114 may be configured to multiply the second phase visible layer vector $\vec{v_1}$ with the stored column weight vector. Similarly, the one or more multiplication results generated by the one or more slave computation modules 114 may be transmitted to the interconnection unit 108.

At block 524, the example method 500 may include combining, by the interconnection unit, the one or more third multiplication results into a third multiplication vector. For example, the interconnection unit 108 may be configured to combine the multiplication results into a third multiplication vector.

At block 526, the example method 500 may include generating a third phase hidden layer vector. For example, the master computation module 112 may optionally perform one or more operations to the third multiplication vector. For example, the master computation module 112 may add a third bias vector to the third multiplication vector to generate a third biased vector, e.g., $\vec{m_3}+\vec{b_3}$, in which $\vec{b_3}$ represents the third bias vector. Alternatively or additionally, the master computation module 112 may be configured to activate the third biased vector, e.g., $f(\vec{m_3}+\vec{b_3})$, in which $f( )$ represents an activation function, to generate a third phase hidden layer vector. Process may continue to block 508.

At block 508, the example method 500 may include calculating weight gradients and updating bias vectors. For example, the master computation module 112 may be configured to transmit the input vector $\vec{v_0}$, the first phase hidden layer vector $\vec{h_0}$, the second phase visible layer vector $\vec{v_1}$, and the third phase hidden layer vector $\vec{h_1}$ to the one or more slave computation modules 114 via the interconnection unit 108. The slave computation modules 114 may be configured to calculate a first cross product between a transpose of the input vector $\vec{v_0}^T$ and the first phase hidden layer vector $\vec{h_0}$. The calculation of the first cross product may be represented as $\vec{h_0} \times \vec{v_0}^T$. Further, the slave computation modules 114 may be configured to calculate a second cross product between a transpose of the second phase visible layer vector $\vec{v_1}^T$ and the third phase hidden layer vector $\vec{h_1}$. The calculation of the second cross product may be represented as $\vec{h_1} \times \vec{v_1}^T$.

Further still, the slave computation modules 114 may be configured to calculate weight gradients based on a learning rate and a difference between the first cross product and the second cross product. The learning rate may refer to a parameter predetermined and adjustable by a system administrator. The calculation of the weight gradients may be represented as $\epsilon(\vec{h_0} \times \vec{v_0}^T - \vec{h_1} \times \vec{v_1}^T)$, in which $\epsilon$ represents the learning rate. The slave computation modules 114 may be further configured to update the weight matrix based on the weight gradients. The update of the weight matrix may be represented as $\overrightarrow{W_{new}} = \vec{W} - \epsilon(\vec{h_0} \times \vec{v_0}^T - \vec{h_1} \times \vec{v_1}^T)$, in which $\overrightarrow{W_{new}}$ represents the updated weight matrix.

Further, the master computation module 112 may be configured to update the first bias vector $\vec{b_1}$, the second bias vector $\vec{b_2}$, and the third bias vector $\vec{b_3}$. In some examples, the first bias vector and the third bias vector may refer to a same vector. Thus, with respect to the first bias vector and the third bias vector, the master computation module 112 may be configured to calculate a difference between the first phase hidden layer vector $\vec{h_0}$ and the third phase hidden layer vector $\vec{h_1}$ to update the first bias vector and the third bias vector. For example, the update process may be represented as $\vec{b_{1/3}} - \epsilon(\vec{h_0} - \vec{h_1})$, in which $\vec{b_{1/3}}$ represents the first bias vector or the third bias vector.

With respect to the second bias vector, the master computation module 112 may be configured to calculate a difference between the input vector $\vec{v_0}$ and the second phase visible layer vector $\vec{v_1}$ to update the second bias vector. For example, the update process may be represented as $\vec{b_2} - \epsilon(\vec{v_0} - \vec{v_1})$.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for neural network operations, the apparatus comprising:
 a master computation circuit configured to transmit an input vector via an interconnection circuit; and
 one or more slave computation circuits connected to the master computation circuit via the interconnection circuit,
 wherein each of the one or more slave computation circuits is configured to:
  respectively store a column weight vector of a weight matrix, and
  multiply the input vector with the column weight vector to generate a first multiplication result, and
 wherein the interconnection circuit is configured to:
  combine one or more first multiplication results of the one or more slave computation circuits into a first multiplication vector, wherein each first multiplication result of the one or more first multiplication results is associated with a respective slave computation circuit of the one or more slave computation circuits, and
  transmit the first multiplication vector to the master computation circuit,
 wherein the master computation circuit is further configured to:
  add a first bias vector to the first multiplication vector to generate a first biased vector,
  activate the first biased vector by applying a first activation function to the first biased vector to generate a first activated vector,
  sample the first activated vector by a Gibbs sampler to generate a first phase hidden layer vector, and
  transmit the first phase hidden layer vector to the one or more slave computation circuits via the interconnection circuit,
 wherein each of the one or more slave computation circuits is configured to:
  multiply the column weight vector with an element of the first phase hidden layer vector to generate a second multiplication result vector, and
  transmit the second multiplication result vector to the interconnection circuit, and
 wherein the interconnection circuit is configured to:
  add one or more second multiplication result vectors of the one or more slave computation circuits into a second multiplication vector, wherein each second multiplication result vector of the one or more second multiplication result vectors is associated with a respective slave computation circuit of the one or more slave computation circuits, and
  transmit the second multiplication vector to the master computation circuit, wherein the master computation circuit is configured to:
  add a second bias vector to the second multiplication vector to generate a second biased vector,
  activate the second biased vector by applying a second activation function to the second biased vector to generate a second activated vector, and
  sample the second activated vector by the Gibbs sampler to generate a second phase visible layer vector,
 wherein the master computation circuit is configured to transmit the second phase visible layer vector to the one or more slave computation circuits via the interconnection circuit,
 wherein each of the one or more slave computation circuits is configured to:
  multiply the second phase visible layer vector with the column weight vector to generate a third multiplication result, and
  transmit the third multiplication result to the interconnection circuit, and
 wherein the interconnection circuit is configured to:
  combine one or more third multiplication results of the one or more slave computation circuits into a third multiplication vector, wherein each third multiplication result of the one or more third multiplication results is associated with a respective slave computation circuit of the one or more slave computation circuits, and
  transmit the third multiplication vector to the master computation circuit,
 wherein the master computation circuit is configured to:
  add a third bias vector to the third multiplication vector to generate a third biased vector, and
  activate the third biased vector by applying a third activation function to the third biased vector to generate a third phase hidden layer vector,
 wherein the master computation circuit is configured to transmit the input vector, the first phase hidden layer vector, the second phase visible layer vector, and the third phase hidden layer vector to the one or more slave computation circuits via the interconnection circuit,
 wherein the one or more slave computation circuits are configured to:

calculate a first cross product between a transpose of the input vector and the first phase hidden layer vector, calculate a second cross product between a transpose of the second phase visible layer vector and the third phase hidden layer vector, and update the weight matrix based on a learning rate and a difference between the first cross product and the second cross product.

2. The apparatus of claim 1, wherein the one or more slave computation circuits are configured to update the first bias vector based on a learning rate and a difference between the first phase hidden layer vector and the third phase hidden layer vector.

3. The apparatus of claim 1, wherein the one or more slave computation circuits are configured to update the second bias vector based on a learning rate and a difference between the input vector and the second phase visible layer vector.

4. A method for neural network operations, the method comprising:

transmitting, by a master computation circuit, an input vector via an interconnection circuit;

respectively storing, by each of one or more slave computation circuits connected to the master computation circuit via an interconnection circuit, a column weight vector of a weight matrix;

multiplying, by each of the one or more slave computation circuits, the input vector with the column weight vector to generate a first multiplication result;

combining, by the interconnection circuit, one or more first multiplication results of the one or more slave computation circuits into a first multiplication vector, wherein each first multiplication result of the one or more first multiplication results is associated with a respective slave computation circuit of the one or more slave computation circuits;

transmitting, by the interconnection circuit, the first multiplication vector to the master computation circuit, adding, by the master computation circuit, a first bias vector to the first multiplication vector to generate a first biased vector, activating, by the master computation circuit, the first biased vector by applying a first activation function to the first biased vector to generate a first activated vector, and sampling, by the master computation circuit, the first activated vector by a Gibbs sampler to generate a first phase hidden layer vector, transmitting, by the master computation circuit, the first phase hidden layer vector to the one or more slave computation circuits via the interconnection circuit;

multiplying, by each of the one or more slave computation circuits, the column weight vector with an element of the first phase hidden layer vector to generate a second multiplication result vector;

transmitting, by each of the one or more slave computation circuits, the second multiplication result vectors to the interconnection circuit;

adding, by the interconnection circuit, one or more second multiplication result vectors of the one or more slave computation circuits into a second multiplication vector, wherein each second multiplication result vector of the one or more second multiplication result vectors is associated with a respective slave computation circuit of the one or more slave computation circuits;

transmitting, by the interconnection circuit, the second multiplication vector to the master computation circuit, adding, by the master computation circuit, a second bias vector to the second multiplication vector to generate a second biased vector, activating, by the master computation circuit, the second biased vector by applying a second activation function to the second biased vector to generate a second activated vector, and sampling, by the master computation circuit, the second activated vector by the Gibbs sampler to generate a second phase visible layer vector, transmitting, by the master computation circuit, the second phase visible layer vector to the one or more slave computation circuits via the interconnection circuit;

multiplying, by each of the one or more slave computation circuits, the second phase visible layer vector with the column weight vector to generate a third multiplication result;

transmitting, by each of the one or more slave computation circuits, the third multiplication result to the interconnection circuit; and combining, by the interconnection circuit, one or more third multiplication results of the one or more slave computation circuits into a third multiplication vector, wherein each third multiplication result of the one or more third multiplication results is associated with a respective slave computation circuit of the one or more slave computation circuits;

transmitting, by the interconnection circuit, the third multiplication vector to the master computation circuit, adding, by the master computation circuit, a third bias vector to the third multiplication vector to generate a third biased vector, activating, by the master computation circuit, the third biased vector by applying a third activation function to the third biased vector to generate a third phase hidden layer vector, transmitting, by the master computation circuit, the input vector, the first phase hidden layer vector, the second phase visible layer vector, and the third phase hidden layer vector to the one or more slave computation circuits via the interconnection circuit, calculating, by the one or more slave computation circuits, a first cross product between a transpose of the input vector and the first phase hidden layer vector, calculating, by the one or more slave computation circuits, a second cross product between a transpose of the second phase visible layer vector and the third phase hidden layer vector, and updating, by the one or more slave computation circuits, the weight matrix based on a learning rate and a difference between the first cross product and the second cross product.

5. The method of claim 4, further comprising updating, by the one or more slave computation circuits, the first bias vector based on a learning rate and a difference between the first phase hidden layer vector and the third phase hidden layer vector.

6. The method of claim 4, further comprising updating, by the one or more slave computation circuits, the second bias vector based on a learning rate and a difference between the input vector and the second phase visible layer vector.

* * * * *